(12) United States Patent
Dwyer et al.

(10) Patent No.: US 11,003,050 B2
(45) Date of Patent: May 11, 2021

(54) VIEWFINDERS WITH REFLECTIVE SURFACE

(71) Applicant: Hewlett-Packard Development Company, L.P., Spring, TX (US)

(72) Inventors: Dan R Dwyer, Vancouver, WA (US); Christopher Mark Rives, Vancouver, WA (US); Nathan Shirley, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/643,300

(22) PCT Filed: Sep. 8, 2017

(86) PCT No.: PCT/US2017/050840
§ 371 (c)(1),
(2) Date: Feb. 28, 2020

(87) PCT Pub. No.: WO2019/050538
PCT Pub. Date: Mar. 14, 2019

(65) Prior Publication Data
US 2020/0192190 A1    Jun. 18, 2020

(51) Int. Cl.
*G03B 13/06*        (2021.01)
(52) U.S. Cl.
CPC .................................. *G03B 13/06* (2013.01)
(58) Field of Classification Search
CPC ........ G03B 13/06; G03B 13/14; G03B 13/08; G02B 23/14
USPC .......................................... 396/377–378, 385
See application file for complete search history.

(56) References Cited

U.S. PATENT DOCUMENTS

| 4,589,749 | A  | * | 5/1986  | Strobel ................. | G03B 13/08 396/377 |
| 5,537,175 | A  | * | 7/1996  | Kamaya ........... | H04N 5/232945 396/376 |
| 6,496,657 | B2 | * | 12/2002 | Aizawa ................. | G03B 13/02 396/103 |
| 6,793,339 | B1 |   | 9/2004  | Yip et al. | |
| 8,345,139 | B2 |   | 1/2013  | Miyazawa et al. | |

(Continued)

FOREIGN PATENT DOCUMENTS

| EP | 0457881 | 11/1991 |
| EP | 3142349 A1 | 3/2017 |

(Continued)

OTHER PUBLICATIONS

Antunes, J,.Sony Rx1r Ii: in Pursuit of the Ideal Viewfinder, Oct. 15, 2015, https://www.provideocoalition.com/ ~ 11 pages.

*Primary Examiner* — Christopher E Mahoney
(74) *Attorney, Agent, or Firm* — HP Inc. Patent Department

(57) ABSTRACT

An example device includes an image capture lens having a first field of view and a viewfinder having a second field of view separate from the first field of view. The image capture lens is to capture an image of a subject in the first field of view. The viewfinder has a first surface that is partially reflective. The first surface is to partially reflect incident light and to partially transmit the incident light therethrough to allow viewing through a second surface of the viewfinder. The second surface is opposite the first surface.

15 Claims, 6 Drawing Sheets

(56) References Cited

U.S. PATENT DOCUMENTS

| | | | |
|---|---|---|---|
| 2007/0058967 A1* | 3/2007 | Bogdanovich | G03B 13/02 |
| | | | 396/376 |
| 2010/0098403 A1 | 4/2010 | Sones | |
| 2012/0314117 A1 | 12/2012 | Irie | |
| 2015/0116503 A1 | 4/2015 | Fredlund | |
| 2017/0187964 A1 | 6/2017 | Sato | |

FOREIGN PATENT DOCUMENTS

| | | | | |
|---|---|---|---|---|
| GB | 2238881 A | * | 6/1991 | G02B 3/00 |
| JP | 2003333148 A | * | 11/2003 | |

\* cited by examiner

VIEWFINDERS WITH REFLECTIVE SURFACE

BACKGROUND

Cameras or other types of imaging devices are commonplace in various environments. For example, personal cameras are used by individuals to take photos of tourist attractions or family members. Such cameras may be digital or film cameras and may come in various models including different features, such as resolution.

BRIEF DESCRIPTION OF THE DRAWINGS

For a more complete understanding of various examples, reference is now made to the following description taken in connection with the accompanying drawings in which.

DETAILED DESCRIPTION

As noted above, personal cameras are used by individuals to take photos of tourist attractions or family members. A recent trend involves users taking photos of themselves, known as selfies. Proper alignment of a camera to take a selfie can be problematic. For example, a user may find it difficult to ensure the camera is pointing in the desired direction. Various examples described herein allow a user to properly align the camera for a selfie.

Various examples described herein relate to a viewfinder for a camera or other imaging device. In various examples, a camera is provided with a lens and a viewfinder. The viewfinder allows a user to aim the camera at the intended subject through a field of view of the viewfinder. The viewfinder is provided with a reflective surface on one side. For example, the side of the viewfinder facing the subject may be reflective, thus allowing a user to properly align the camera to take a selfie. The lens has a field of view that is separate from the field of view of the viewfinder. In some examples, the viewfinder is calibrated to the field of view of the lens at an imaging distance, such as one meter or an average arm length. Thus, at the imaging distance, the image in the viewfinder, the reflection on the reflective surface and the image in the field of view of the lens are substantially similar. In some examples, the imaging distance may be adjustable by the user.

Figure 1:
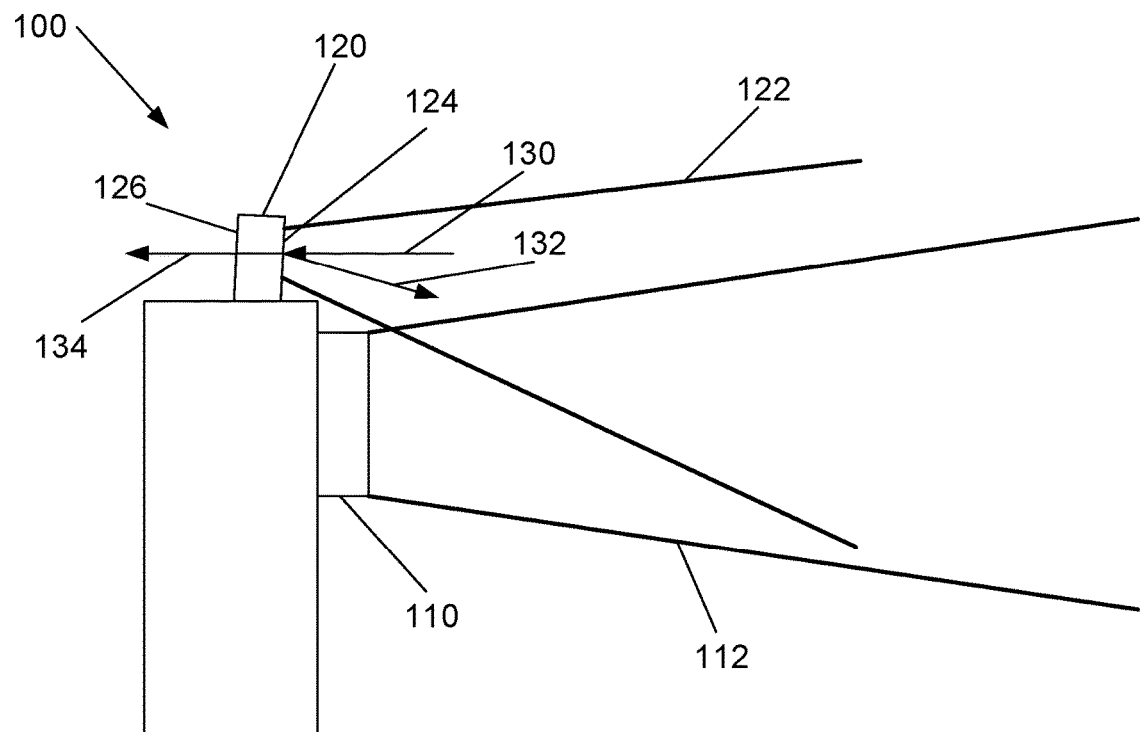
FIG. 1 illustrates an example device with a viewfinder.

Referring now to the Figures, FIG. 1 illustrates an example device with a viewfinder. The example device 100 of FIG. 1 may be an image capture device, such as a camera (e.g., a digital camera). In this regard, the example device 100 includes an image capture lens 110. In various examples, the image capture lens 110 may be coupled to various components within the example device 100 to process, store or print a captured image.

The image capture lens 110 of the example device 100 has a field of view 112 within which the image capture lens 110 can capture an image. The size of the field of view 112 may vary based on the type of lens provided. For example, a telephoto lens may have a narrow field of view 112, while a wide-angle (or fish-eye) lens may have a wide field of view.

The example device 100 of FIG. 1 is provided with a viewfinder 120 through which a user may aim the example device 100. In this regard, the viewfinder 120 has a field of view 122 which is separate from the field of view of the image capture lens 110. Thus, the view from the viewfinder 120 is not directed through the image capture lens 110. In various examples, while the field of view 122 of the viewfinder 120 is separate from the field of view 112 of the image capture lens 110, the two fields of view 112, 122 are directed in generally the same direction.

In the example device 100 of FIG. 1, the viewfinder 120 is provided with a first surface 124 that is partially reflective. As illustrated in the example of FIG. 1, the first surface 124 that is partially reflective is the surface on the side of the image capture lens 110. In this regard, the first surface 124 partially reflects light that is incident on the viewfinder 120 and partially transmits the light through the viewfinder 120. As illustrated in FIG. 1, incident light 130 is partially reflected as reflected light 132 and partially transmitted as transmitted light 134. Thus, when taking a selfie, a user can view the reflected image (e.g., reflected light 132) to ensure the example device 100 is properly aimed. When taking a photo of others, a user can properly aim by viewing the target or subject through a second surface 126 of the viewfinder 120 (e.g., transmitted light 134). Of course, the second surface 126 is on the opposite side from the first surface 124 and is on the side opposite the image capture lens 110.

In various examples, the first surface 124 of the viewfinder may be made partially reflective in any of a variety of manners. For example, the first surface 124 may be provided with a partially reflective coating.

Figure 2:
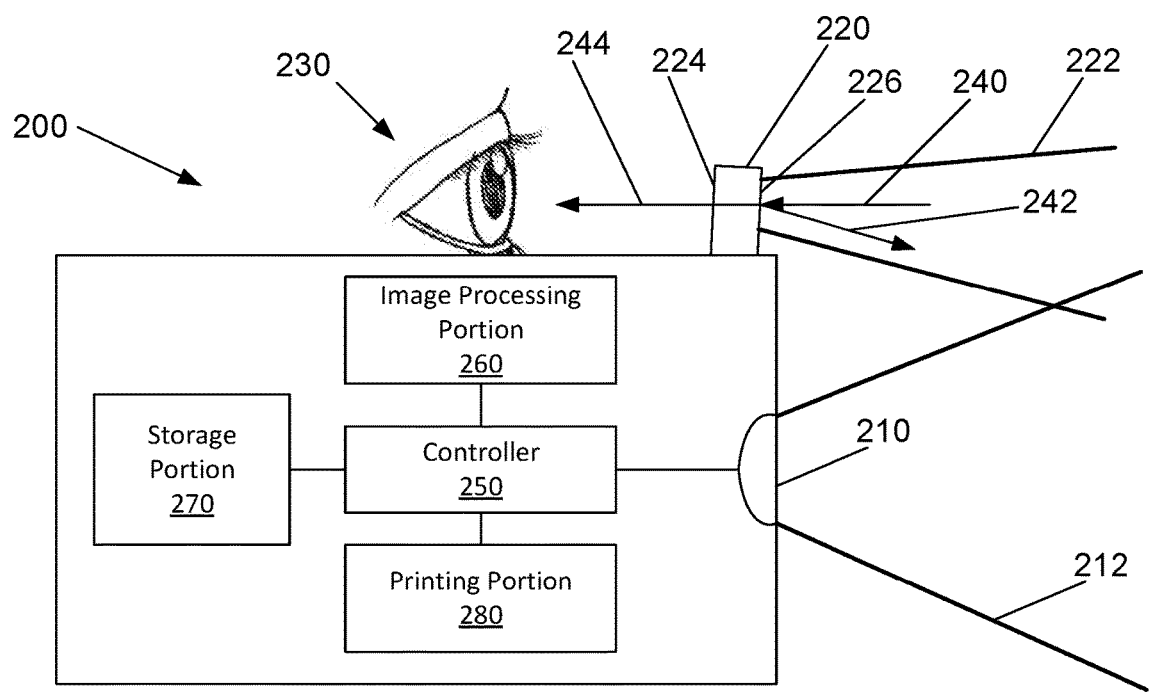
FIG. 2 is a schematic illustration of an example device with a viewfinder.

Referring now to FIG. 2, an example device with a viewfinder is schematically illustrated. The example device 200 of FIG. 2 is similar to the example device 100 described above with reference to FIG. 1 and includes an image capture lens 210 and a viewfinder 220. The image capture lens 210 has a field of view 212, and the viewfinder 220 has a separate field of view 222.

In the example device 200 of FIG. 2, the viewfinder 220 has a first side 224 which allows a user 230 to view the field of view 222 of the viewfinder 220. The viewfinder 220 has a second side 226, opposite the first side 224, which partially reflects light incident on the viewfinder 220. Thus, as indicated in FIG. 2, incident light 240 is partially reflected by the second side 226 of the viewfinder as reflected light 242. At least some of the incident light 240 is transmitted through the viewfinder 220 to, for example, the user 230 as transmitted light 244.

The example device 200 of FIG. 2 is provided with additional components that are coupled to the image capture lens 210. In the illustrated example of FIG. 2, the example device 200 is provided with a controller 250 to control operation of various aspects of the example device 200. For example, the controller 250 may be coupled to a user interface (not shown) to selectively perform various functions. In this regard, the example device 200 includes an image processing portion 260 coupled to the controller 250. The image processing portion 260 may be provided to capture an image through the image capture lens 210. In various examples, the image processing portion 260 may control lighting, focus or other aspects of the image capture function.

The example device 200 is further provided with a storage portion 270. The storage portion 270 may include a memory, such as a flash memory or other types of memory, to store a captured image. In this regard, the storage portion 270 may allow for storage of a large number of images for access, download or upload at a later time.

The example device 200 further includes a printing portion 280. In various examples, the printing portion 280 may allow a user to print an image captured by the image processing portion 260 or an image stored in the storage portion 270 of the example device 200. Of course, the example device 200 may include various other components and functions, such as power or wireless communication, for example.

Figure 3:
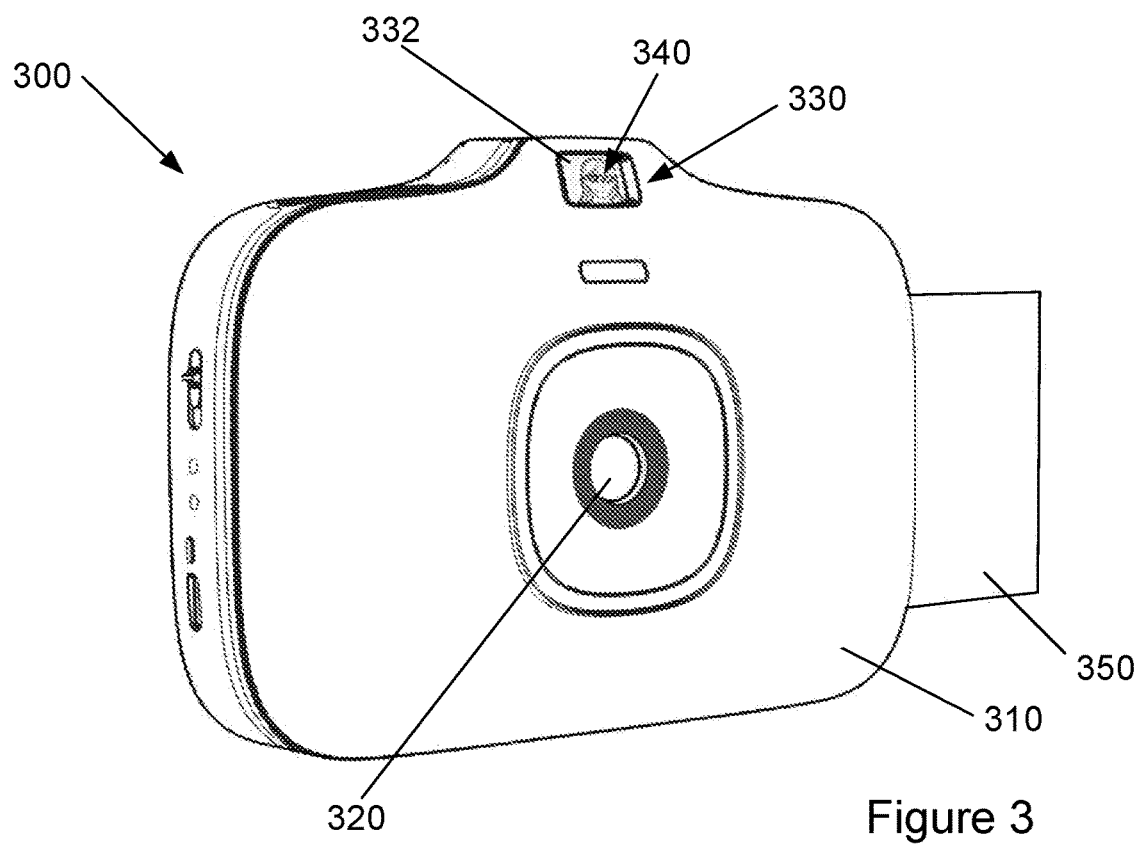
FIG. 3 is a front perspective view of an example camera with a viewfinder.
Figure 4:
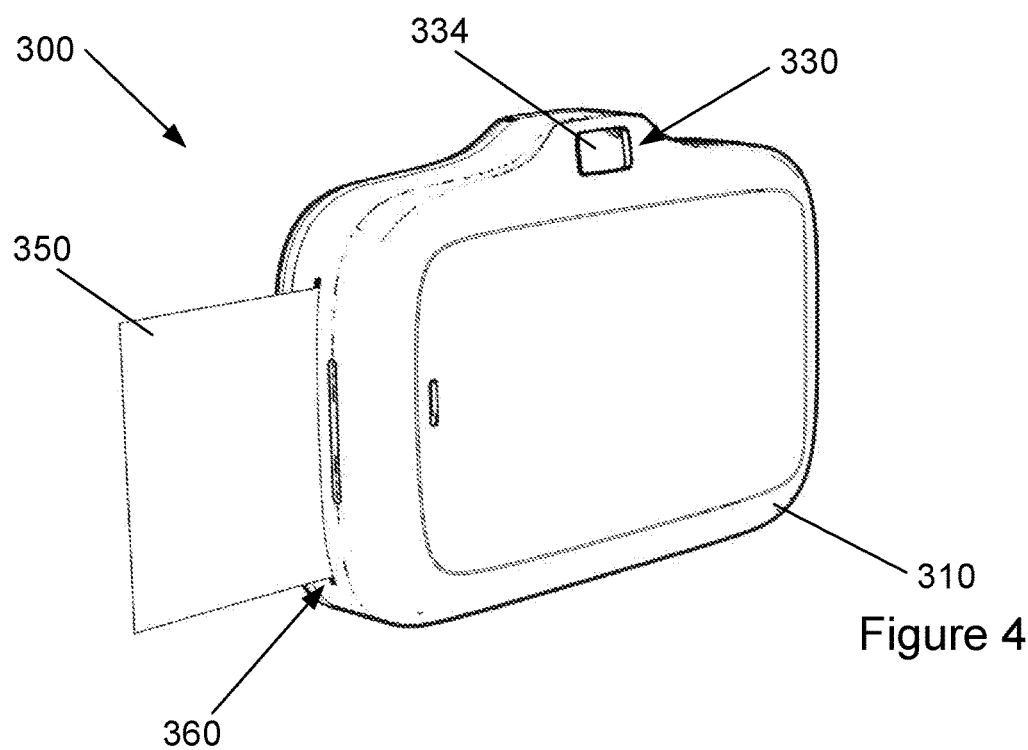
FIG. 4 is a rear perspective view of the example camera of FIG. 3.

Referring now to FIGS. 3 and 4, two views of an example camera with a viewfinder are illustrated. FIG. 3 is a front perspective view, and FIG. 4 is a rear perspective view of the example camera 300. The example camera 300 includes a body 310 which may be formed of any of a variety of materials. For example, in various examples, the body 310 is formed of a molded plastic or a metal. The example camera 300 is provided with an image capture lens 320 on the front of the body 310.

The example camera 300 of FIGS. 3 and 4 includes a viewfinder 330 that is integrally formed with the body 310 of the example camera 300. The viewfinder 330 has a front surface 332 on the front of the camera 300 (same side as the image capture lens 320) and a rear surface 334 on the back of the camera 300. The front surface 332 has a reflective surface that can reflect an image 340 that is being captured by the camera 300. Thus, a user taking a selfie can confidently aim the camera to take a photo.

The rear surface 334 of the viewfinder 330 allows a user to see through the viewfinder 330 to the other side of the camera 300. Thus, the user can see substantially the same image as the image to be captured by the image capture lens 320.

In various examples, the camera 300 is provided with a printing portion within the body 310. The printing portion (not shown) can, for example, output a printed picture 350 of an image captured by the camera 300. In this regard, the printing portion can output the printed picture 350 through an output slot 360 formed on the side of the example camera 300 of FIGS. 3 and 4.

Referring now to FIGS. 5A-D, an example camera 500 with a retractable viewfinder is illustrated in various stages of deployment. The example camera 500 of FIGS. 5A-D is similar to the example camera 300 of FIGS. 3 and 4 and includes a body 510 and an image capture lens 520. While the example camera 300 of FIGS. 3 and 4 includes a viewfinder 330 that is integrated with the body 310 of the camera 300, the example camera 500 of FIGS. 5A-D includes a viewfinder 530 that is selectively movable between a retracted position (shown in FIG. 5A) and a deployed position (shown in FIG. 5D).

Figure 5:
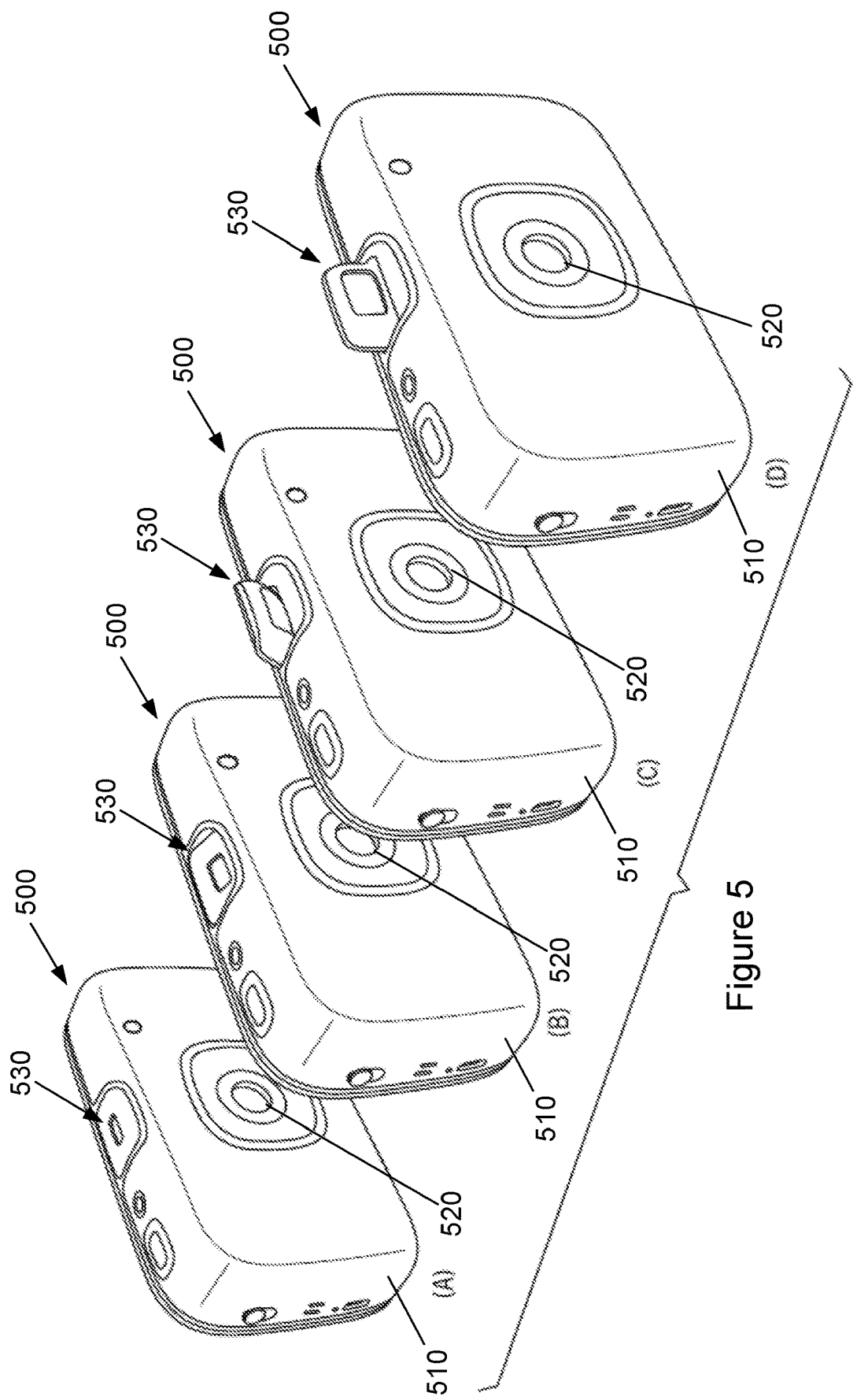
FIGS. 5A-D illustrate an example camera with a retractable viewfinder in various stages of deployment.

In the example camera 500, the viewfinder 530 may be stored in a retracted position when not in use, as shown in FIG. 5A. A latching mechanism (not shown) may be provided within the body 510 to secure the viewfinder 530 in the retracted position. When a user wishes to use the camera 500, the viewfinder 530 may be depressed, as shown in FIG. 5B. Depressing of the viewfinder 530 may cause the latching mechanism to release the viewfinder 530. A resilient member, such as a torsion spring, may cause the viewfinder 530 to be forced outward, or upward, as shown in FIG. 5C, until it reaches a deployed position, as shown in FIG. 5D. A physical stop may be provided to prevent the viewfinder 530 from extending beyond the deployed position. When the user wishes to store the viewfinder 530, the viewfinder may be pressed downward into the retracted position (FIG. 5A) where it may be secured by the latching mechanism.

Figure 6:
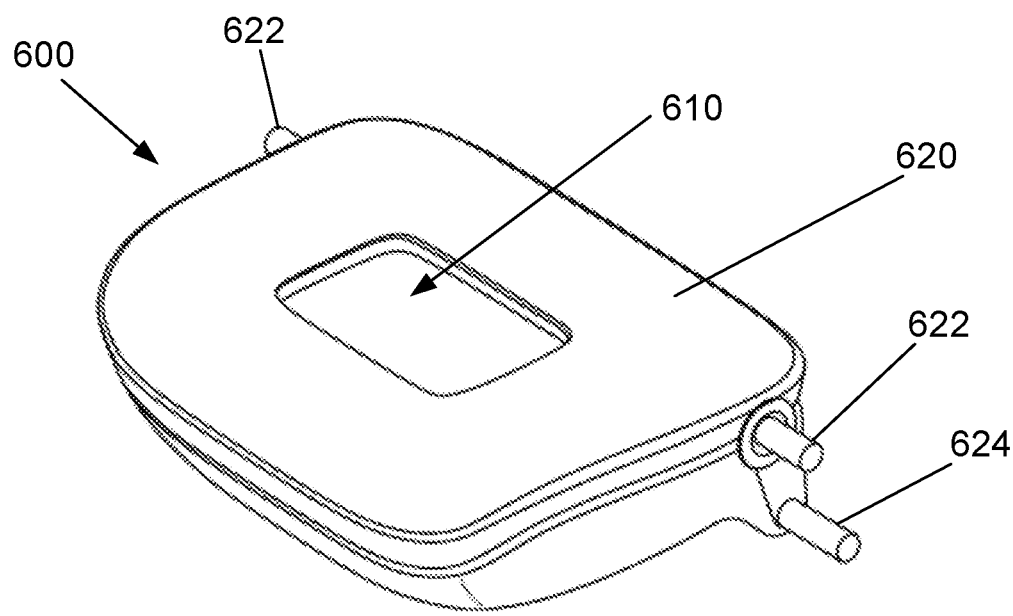
FIG. 6 illustrates an example viewfinder.

Referring now to FIG. 6, an example viewfinder that may be used with a camera such as the example camera 500 of FIGS. 5A-D is illustrated. The example viewfinder 600 of FIG. 6 may be used as a retractable viewfinder in a camera. In this regard, the viewfinder 600 is provided with a window 610 which may include a partially reflective side and a see-through side as described in the various examples above. The window 610 may be supported within a frame 620. The frame 620 and the window 610 may be formed of any of a variety of materials. For example, the frame 620 may be formed of a molded plastic.

To facilitate the retraction and deployment of the viewfinder 600, the frame 620 is provided with pegs 622 and 624. The pegs 622, 624 may be provided on each side of the viewfinder frame 620. In various examples, the pegs 622, 624 may engage the body of the camera in which the viewfinder 600 is installed. For example, the pegs 622 may form a pivot axle about which the viewfinder 600 rotates when moved between the deployed position and the retracted position. In this regard, the pegs 622 may be inserted into corresponding holes formed in the body of the camera. The pegs 624 may then be inserted into a grooved track. Thus, when the viewfinder 600 is moved between the deployed position and the retracted position, the pegs 624 travel along the grooved track as the viewfinder 600 rotates about the axle formed by the pegs 622.

Figure 7:
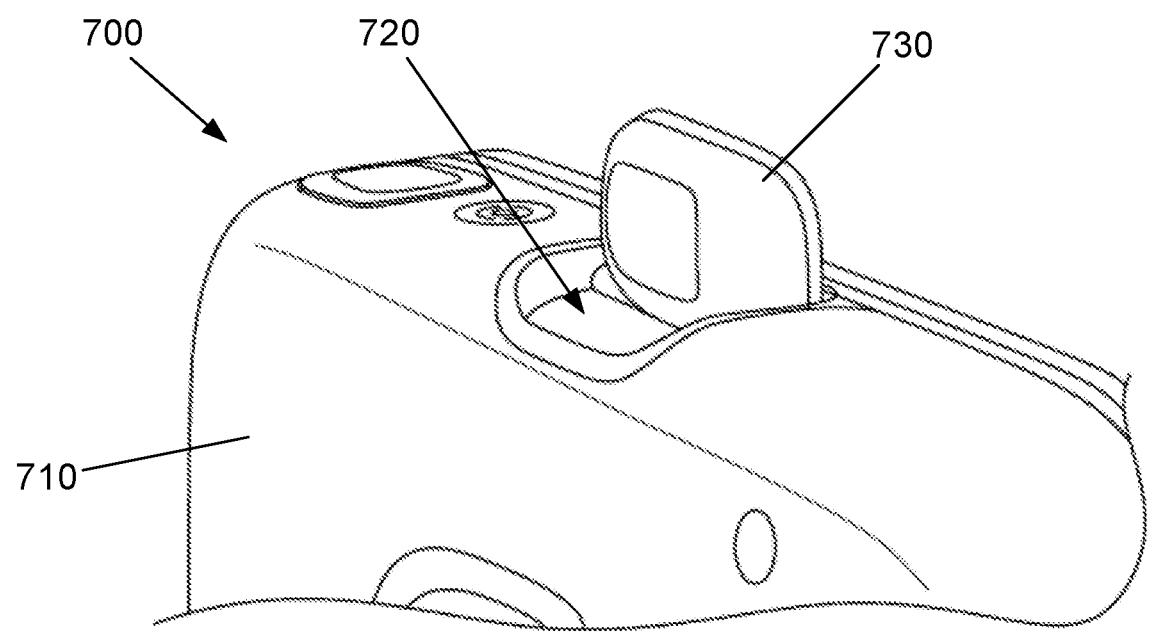
FIG. 7 illustrates an example camera with a retractable viewfinder.

Referring now to FIG. 7, an example camera with a retractable viewfinder is illustrated. The example camera 700 includes a body 710 with a seat 720 formed to receive a viewfinder 730 when the viewfinder 730 is moved to a retracted position. FIG. 7 illustrates the viewfinder 730 in the deployed position. When the viewfinder 730 is rotated into the retracted position, it may reside in the seat 720 to become substantially flush with the surface of the body 710 of the camera 700.

Figure 8:
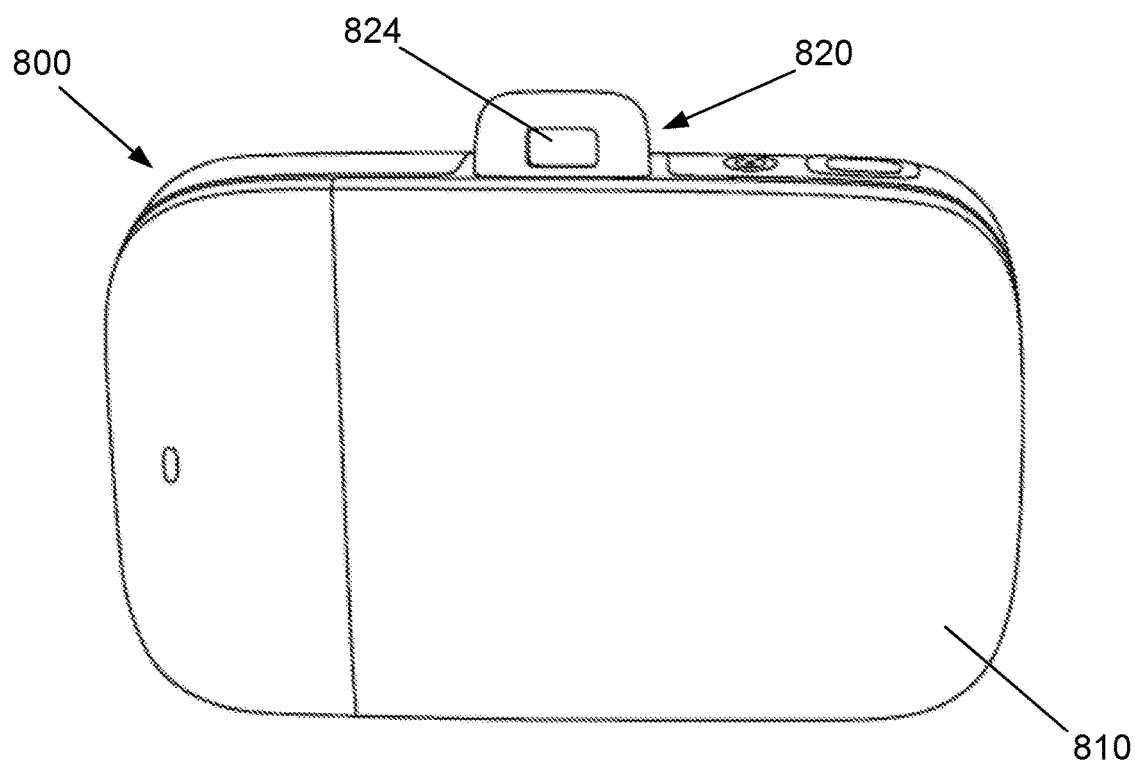
FIG. 8 is a rear view of an example camera with a viewfinder.

Referring now to FIG. 8, a rear view of an example camera with a viewfinder is illustrated. The example camera 800 is similar to the various examples describe above and includes a body 810 and a viewfinder 820. As noted above, the front surface of the viewfinder 820 (not shown in FIG. 8) may include a reflective surface, and the back surface 824 of the viewfinder 820 includes a see-through surface. As noted above, the viewfinder 820 has a different field of view than the image capture lens (not shown in FIG. 8) of the camera 800. In various examples, the viewfinder is calibrated during manufacture such that the field of view of the viewfinder and the field of view of the image capture lens coincide at an imaging distance from the camera. For example, the fields of view of the viewfinder and the lens may coincide at an imaging distance of 1 meter.

Figure 9:
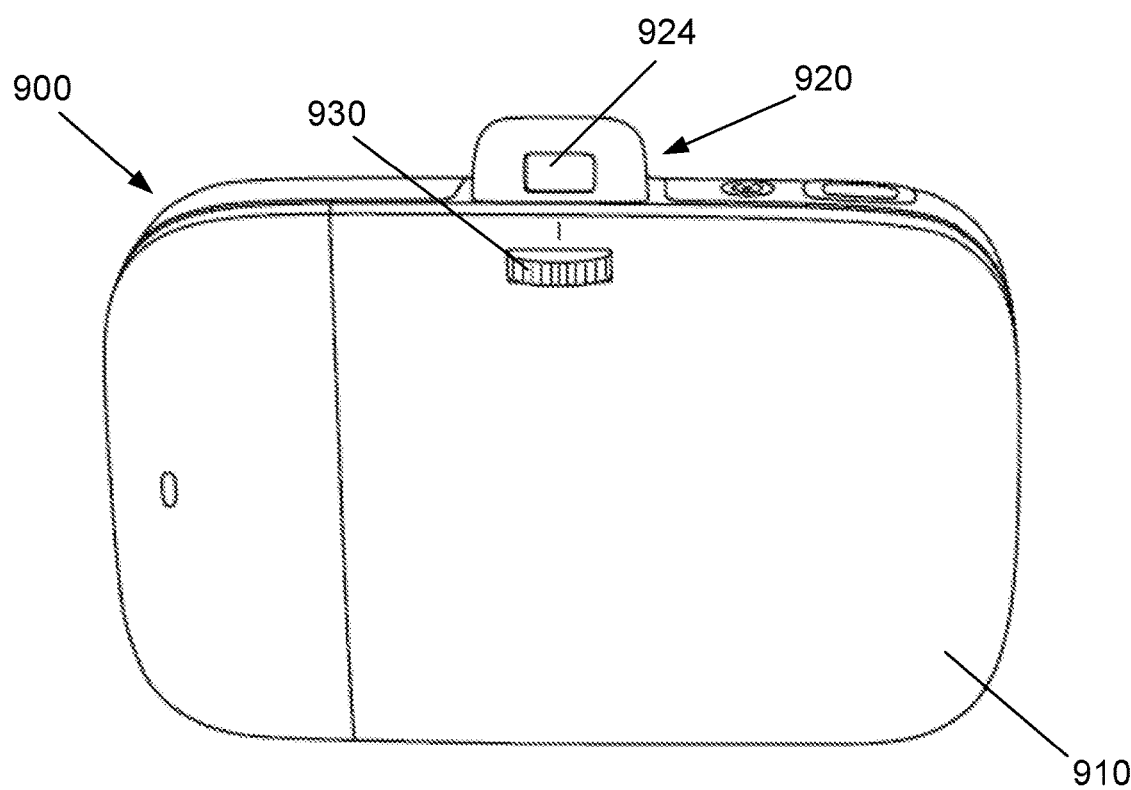
FIG. 9 is a rear view of another example camera with an adjustable viewfinder.

In the example of FIG. 8, the imaging distance is calibrated at a fixed imaging distance. In other examples, the imaging distance may be variable. For example, FIG. 9 illustrates a rear view of another example camera 900 with an adjustable viewfinder 920. The example camera 900 of FIG. 9 is similar to the example camera 800 of FIG. 8 and includes a camera body 910 and a viewfinder 920. As noted above, the front surface of the viewfinder 920 (not shown in FIG. 9) may include a reflective surface, and the back surface 924 of the viewfinder 920 includes a see-through surface. In the example camera 900 of FIG. 9, the body 910 is provided with a dial 930 to allow for adjustment of the imaging distance. In this regard, rotation of the dial 930 results in variation of the angle of the viewfinder. Thus, a rotation of the dial 930 may change the distance at which the fields of view of the viewfinder 920 and the image capture lens coincide.

Figure 10:
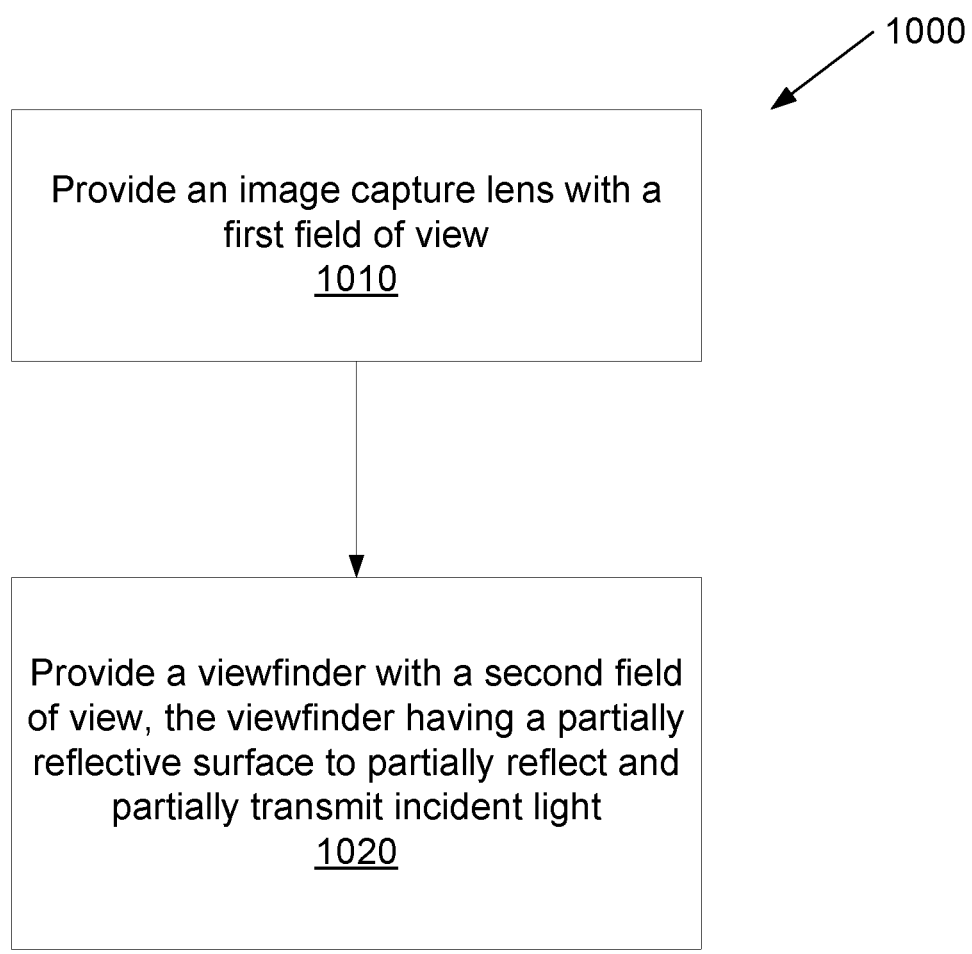
FIG. 10 is a flowchart illustrating an example method.

Referring now to FIG. 10, a flow chart illustrates an example method. The example method 1000 includes providing an image capture lens with a first field of view (block 1010). For example, as described above with reference to FIG. 1, the example device 100 is provided with an image capture lens 110 with a first field of view 112.

The example method 1000 further includes providing a viewfinder with a second field of view (block 1020). Again referring to the example of FIG. 1, the example device 100 is provided with a viewfinder 120 with a second field of view 122. In the example method 1000 of FIG. 10, the viewfinder has a partially reflective surface to partially reflect incident light and to partially transmit the incident light through the viewfinder. As illustrated in FIG. 1, the viewfinder is provided with a surface 124 on the side of the image capture lens to partially reflect incident light 130 as reflected light 132 and to partially transmit the incident light 130 as transmitted light 134.

Thus, in accordance with various examples described herein, a user taking a selfie with a camera can properly align the camera to capture the desired subject. A reflective surface on the viewfinder allows a user to see his own image while taking a selfie, for example. Thus, the user can be confident in capturing the desired image.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A device, comprising:
    an image capture lens having a first field of view, the image capture lens being to capture an image of a subject in the first field of view; and
    a viewfinder having a second field of view separate from the first field of view of the image capture lens, the viewfinder having a front surface on a front of the viewfinder providing a first view of the subject to be captured by the image capture lens and a rear surface on a back of the viewfinder providing a second view of the subject to be captured by the image capture lens, wherein the front surface is a partially reflective surface which enables incident light to be transmitted through the front surface to the rear surface allowing the subject to be viewed through the rear surface and reflects the image of the subject allowing the subject to be viewed on the front surface of the viewfinder, and wherein the viewfinder is rotatable about a pivot axle between a stored position when the viewfinder is not in use and a deployed position when the viewfinder is to be used.

2. The device of claim 1, wherein the viewfinder is selectively positioned in the deployed position or the stored position.

3. The device of claim 2, further comprising a latch mechanism to selectively position the viewfinder in the deployed position or the stored position.

4. The device of claim 1, wherein the viewfinder is calibrated to coincide the first field of view with the second field of view at an imaging distance.

5. The device of claim 4, wherein the image distance is adjustable by a user.

6. The device of claim 1, further comprising an image processing device coupled to the image capture lens to at least one of process, store or print the image captured by the image capture lens.

7. The device of claim 1, wherein the front surface includes a reflective coating allowing the front surface to partially transmit and partially reflect the incident light.

8. A system, comprising:
    an image capture lens on a front of the system to capture an image in a first field of view of the image capture lens; and
    a viewfinder having a second field of view directed in a same direction as the first field of view of the image capture lens towards the subject to be captured by the image capture lens, the viewfinder including a front surface on a front of the viewfinder providing a first view of the subject and a rear surface on a back of the viewfinder providing a second view of the subject, wherein the front surface is a partially reflective surface which enables incident light to be transmitted through the front surface to the rear surface allowing the subject to be viewed through the rear surface and reflects the image of the subject allowing the subject to be viewed on the front surface of the viewfinder, and wherein the viewfinder is rotatable about a pivot axle between a stored position when the viewfinder is not in use and a deployed position when the viewfinder is to be used.

9. The system of claim 8, further comprising:
    a controller coupled to the image capture lens, the controller being to cause at least one function to be performed for the image captured by the image capture lens, wherein the at least one function includes processing, storing or printing the image.

10. The system of claim 8, wherein the viewfinder is selectively positioned in the deployed position or the stored position.

11. The system of claim 10, further comprising a latch mechanism to selectively position the viewfinder in the deployed position or the stored position.

12. The system of claim 8, wherein the viewfinder is calibrated to coincide the first field of view with the second field of view at an imaging distance.

13. The system of claim 12, wherein the image distance is adjustable by a user.

14. The system of claim 8, wherein the front surface includes a reflective coating allowing the front surface to partially transmit and partially reflect the incident light.

15. A method, comprising:

providing an image capture lens on a front of a camera to capture an image in a first field of view of the image capture lens; and providing a viewfinder having a second field of view, wherein the viewfinder includes a front surface on a front of the viewfinder providing a first view of the subject to be captured by the image capture lens and a rear surface on a back of the viewfinder providing a second view of the subject to be captured by the image capture lens, wherein the front surface is a partially reflective surface which enables incident light to be transmitted through the front surface to the rear surface allowing the subject to be viewed through the rear surface and reflects the image of the subject allowing the subject to be viewed on the front surface of the viewfinder, and wherein the viewfinder is rotatable about a pivot axle between a stored position when the viewfinder is not in use and a deployed position when the viewfinder is to be used.

* * * * *